(12) United States Patent
Barriga et al.

(10) Patent No.: US 8,386,767 B2
(45) Date of Patent: Feb. 26, 2013

(54) METHODS AND SYSTEMS FOR BOOTSTRAPPING SECURITY KEY INFORMATION USING SESSION INITIATION PROTOCOL

(75) Inventors: Luis Barriga, Johanneshov (SE); David Castellanos Zamora, Madrid (ES)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 599 days.

(21) Appl. No.: 12/542,532

(22) Filed: Aug. 17, 2009

(65) Prior Publication Data

US 2010/0049980 A1 Feb. 25, 2010

Related U.S. Application Data (60) Provisional application No. 61/089,167, filed on Aug. 15, 2008.

(51) Int. Cl.
*H04L 29/06* (2006.01)

(52) U.S. Cl. .............. 713/152; 713/171; 380/227
(58) Field of Classification Search .............. 713/171, 713/152
See application file for complete search history.

(56) References Cited

U.S. PATENT DOCUMENTS

| | | | |
|---|---|---|---|
| 2008/0301785 A1* | 12/2008 | Beyer et al. | 726/5 |
| 2008/0307518 A1* | 12/2008 | Holtmanns et al. | 726/12 |

OTHER PUBLICATIONS

Generic Bootstrapping Architecture(GBA) Framework, Gabor Bajko, Mar. 30, 2006, pp. 1-59.*

\* cited by examiner

*Primary Examiner* — Jung Kim
*Assistant Examiner* — Ghodrat Jamshidi
(74) *Attorney, Agent, or Firm* — Roger S. Burleigh (57) ABSTRACT

Methods, systems and communication nodes for bootstrapping key establishment to exchange encryption keys between a terminal-based client and an application server using Session Initiation Protocol (SIP) signaling are described.

14 Claims, 13 Drawing Sheets

METHODS AND SYSTEMS FOR BOOTSTRAPPING SECURITY KEY INFORMATION USING SESSION INITIATION PROTOCOL

RELATED APPLICATION

This application is related to, and claims priority from, U.S. Provisional Patent Application Ser. No. 61/089,167, entitled "SIP OVER UA—GAA ACCESS TO NAF USING SIP" which was filed on Aug. 15, 2008, the entire disclosure of which is expressly incorporated here by reference.

TECHNICAL FIELD

The present invention relates generally to telecommunications systems and improving service therein and, more particularly, to providing secure communications and bootstrapping security key information between a client and an application server in such systems.

BACKGROUND

As the sophistication level of communications technology increases, the options for communications service have become more varied. For example, in the last 30 years in the telecommunications industry, personal communications have evolved from a home having a single rotary dial telephone, to a home having multiple telephone, cable and/or fiber optic lines that accommodate both voice and data. Additionally, cellular phones and Wi-Fi have added a mobile element to communications. Similarly, in the entertainment industry, 30 years ago there was only one format for television and this format was transmitted over the air and received via antennas located at homes. This has evolved into both different standards of picture quality such as, standard definition TV (SDTV), enhanced definition TV (EDTV) and high definition TV (HDTV), and more systems for delivery of these different television display formats such as cable and satellite. Additionally, services have grown to become overlapping between these two industries. As these systems continue to evolve in both industries, the service offerings will continue to merge and new services can be expected to be available for a consumer. Also these services will be based on the technical capability to process and output more information, for example as seen in the improvements in the picture quality of programs viewed on televisions, and therefore it is expected that service delivery requirements will continue to rely on more bandwidth being available throughout the network including the "last mile" to the end user.

Another related technology that impacts both the communications and entertainment industries is the Internet. The physical structures of the Internet and associated communication streams have also evolved to handle an increased flow of data. Servers have more memory than ever before, communications links exist that have a higher bandwidth than in the past, processors are faster and more capable and protocols exist to take advantage of these elements. As consumers' usage of the Internet grows, service companies have turned to the Internet (and other Internet Protocol (IP) networks) as a mechanism for providing traditional services. These multimedia services include IP television (IPTV, referring to systems or services that deliver television programs over a network using IP data packets), video on demand (VOD), voice over IP (VoIP), and other web related services received singly or bundled together.

To accommodate the new and different ways in which IP networks are being used to provide various services, new network architectures are being developed and standardized. Internet Multimedia Subsystem (IMS) is an architectural framework utilized for delivering IP multimedia services to an end user. The IMS architecture has evolved into a service-independent topology which uses IP protocols, e.g., Session Initiation Protocol (SIP) signaling, to provide a convergence mechanism for disparate systems. In part this is accomplished via the provision of a horizontal control layer which isolates the access network from the service layer. Among other things, IMS architectures may provide a useful platform for the rollout of IPTV systems and services.

The IMS infrastructure offers several SIP-based services, e.g., security, reliability, routing, and QoS charging, that make it attractive for other purposes. For example, there are ongoing discussions in 3GPP to use IMS for key management in media security. The 3GPP organization is currently conducting a technical study on "IMS Media Security", as described, for example, in 3GPP TR 33.828: "3rd Generation Partnership Project; Technical Specification Group Services and System Aspects: IMS media plane security", by collecting requirements and candidate technical solutions for securing media in IMS applications between two or more clients. For example, some of the contributions to this 3GPP study provide for a network function that manages the keys to be distributed and used for media protection. In particular, one of the trust models that is being considered is a model wherein IMS applications are used for National Security, Public Safety, Governmental and Enterprise Communications. In such "mission-critical" scenarios, the requirements on media protection are very high, and are also referred to as "end-to-end security" requirements, in the sense that only the sender, receiver and their organizations shall be able to access the protected media and corresponding keys.

The mission-critical trust model is different than the model used in the consumer market where an IMS operator has control over the IMS applications and their security. In mission-critical applications, there is a new independent actor, namely a third party organization, which is an entity which is different than the operator or the end user, which relies on one or more IMS operators for the media transport, but not for the security aspects of that media transport. Technically, this means that the IMS core infrastructure is managed by the IMS operator(s), whereas the key management function and application server are managed (hosted or externally located) by a third party. The reason behind this arrangement is that for regulatory or commercial reasons, or roaming scenarios, the keys for protecting media are intended to be available only to the communicating parties and the organization, and not to other parties, e.g., the operator.

In OMA, there is ongoing work to distribute location information over a SIP/IP core that, in many cases, will be IMS. For example, OMA is finishing standardizing a location server that can be reached over a SIP-based interface by a location client in a SIP/IP core network that, at least in most cases, will be IMS.

Additionally, in 3GPP, discussions have started to converge IMS and MBMS. For example, in 3GPP SA4 and SA3 have started to investigate the possibilities for a converged architecture for PSS (TS 26.234), MBMS (TS 33.246) and IMS. In the case of aligning MBMS to the IMS security architecture, it is not clear how the broadcast key management required for MBMS shall be handled. In particular, MBMS relies on the GBA architecture, wherein a function called the BM-SC (Broadcast Multicast Service Center) takes the role of the NAF. To access MBMS services, the UE must first establish a shared key with the BSF on the HTTP based Ub reference point, and then authenticate to the BM-SC over the HTTP based Ua reference point, using this shared key as a basis. IMS security is only concerned with access protection from the UE to the P-CSCF, and is not capable of establishing keys between the application servers and the UEs.

Additionally, the HTTP based reference points Ua and Ub are not part of the IMS standard, and do not fit into the IMS architecture. In a liaison statement sent from 3GPP SA4 to 3GPP SA3 (S3-080656), the BSF was included in the converged architecture, but had no reference points attached to it, since it is not known how to accomplish the integration of the BSF in the IMS security architecture. The trust model used in MBMS is also different from what IMS can provide. MBMS requires protection from the BMSC (application server) to the UE, whereas IMS relies on access protection between the UE and the P-CSCF (which may be located in the visited network). The IMS trust model is thus not sufficient for MBMS.

Accordingly, it would be desirable to provide systems and methods which address security issues in such architectures and, more specifically, which enable a client to securely communicate with, and exchange security keys with, an application server in such network architectures.

SUMMARY

According to an exemplary embodiment a method for bootstrapping key establishment between a terminal-based client, a bootstrapping server, and an application server using Session Initiation Protocol (SIP) signaling is described. A SIP message is used to obtain a Bootstrapping Transaction Identifier (B-TID). Another SIP message is transmitted from the terminal-based client, which message includes said B-TID. The SIP message is received at a SIP/IP core node and routed to the application server. In response to the received SIP message, the application server transmits an authorization request message which includes the B-TID to a bootstrapping function (BSF) entity. The BSF entity generates a Ks_(ext/int)_NAF value associated with said B-TID, and transmits the Ks_(ext/int)_NAF value back to the application server. The application server then transmits a response message back to the SIP/IP core node, which routes the response message to the terminal-based client.

According to another exemplary embodiment, a system for bootstrapping key establishment using Session Initiation Protocol (SIP) signaling includes a terminal-based client device which is configured to obtain via SIP a Bootstrapping Transaction Identifier (B-TID) and transmit a SIP message including said B-TID. A SIP/IP core node receives this SIP message and routes the SIP message, including the B-TID, to an application server. The application server then transmits an authorization request message which includes the B-TID to a bootstrapping function (BSF) entity. The BSF entity generates a Ks_(ext/int)_NAF value associated with the B-TID and transmits the Ks_(ext/int)_NAF value to the application server. The application server then transmits a response message back to the SIP/IP core node, and the SIP/IP core node routes that response message to the terminal-based client.

According to another exemplary embodiment, a method for bootstrapping key establishment between a terminal-based client and an application server using Session Initiation Protocol (SIP) signaling includes receiving a SIP message which has a Bootstrapping Transaction Identifier (B-TID) at the application server. In response to this SIP message, the application server transmits an authorization request message, which includes the B-TID, to a bootstrapping function (BSF) entity. The application server then receives a Ks_NAF value and transmits a response to the SIP message.

According to still another exemplary embodiment, an application server includes a transceiver configured to receive a Session Initiation Protocol (SIP) message which includes a Bootstrapping Transaction Identifier (B-TID). The application server then transmits, in response to the SIP message, an authorization request message which includes the B-TID toward a bootstrapping function (BSF) entity. In response, the transceiver subsequently receives a Ks_NAF value and transmits a response to said SIP message.

According to another exemplary embodiment, a method for bootstrapping key establishment to exchange security keys between a terminal-based client and a location application server using Session Initiation Protocol (SIP) signaling can be described from a user equipment's point of view. A terminal-based client transmits a SIP message including a Bootstrapping Transaction Identifier (B-TID). In response, the terminal based client receives a message including an encryption key.

According to still another exemplary embodiment, a user equipment includes a transceiver which is configured to transmit a Session Initiation Protocol (SIP) message including a Bootstrapping Transaction Identifier (B-TID) and to receive a response to that SIP message.

BRIEF DESCRIPTION OF THE DRAWINGS

The accompanying drawings illustrate exemplary embodiments, wherein.

LIST OF ABBREVIATIONS

AKA Authentication and Key Agreement
B-TID Bootstrapping Transaction Identifier
BSF Bootstrapping Server Function
GAA Generic Authentication Architecture
GBA Generic Bootstrapping Architecture
HSS Home Subscriber System
NAF Network Application Function
IMPI IP Multimedia Private Identity
IMPU IP Multimedia Public Identity
IMSI International Mobile Station Identity
MBMS Multimedia Broadcast Multicast Service
MSISDN Mobile Station Integrated Services Digital Network
P/S CSCF Proxy/Serving Call State Call Function Node
SIP Session Initiation Protocol

DETAILED DESCRIPTION

The following detailed description of the exemplary embodiments refers to the accompanying drawings. The same reference numbers in different drawings identify the same or similar elements. Also, the following detailed description does not limit the invention. Instead, the scope of the invention is defined by the appended claims.

Systems, methods, devices and software according to exemplary embodiments address, for example, key management services associated with media delivery in SIP-based systems such as IMS. In order to provide context for this discussion, several high level, exemplary groupings of devices, systems and communication links in which such key management services can be implemented will now be described with respect to FIGS. 1(a)-1(c).

Figure 1A:
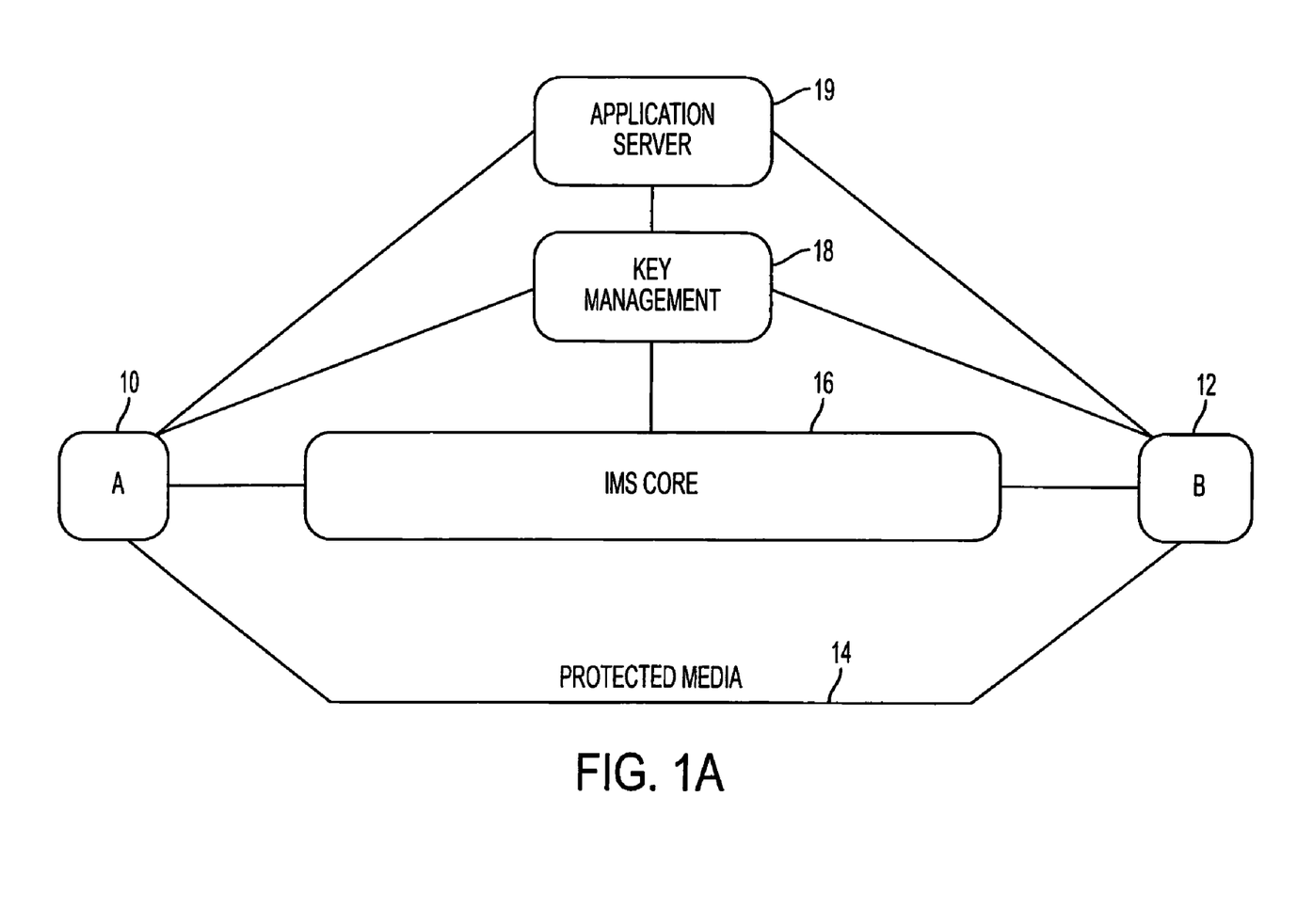
FIGS. 1(a)-1(c) depict high level architectural considerations associated with key exchange issues.
Figure 1B:
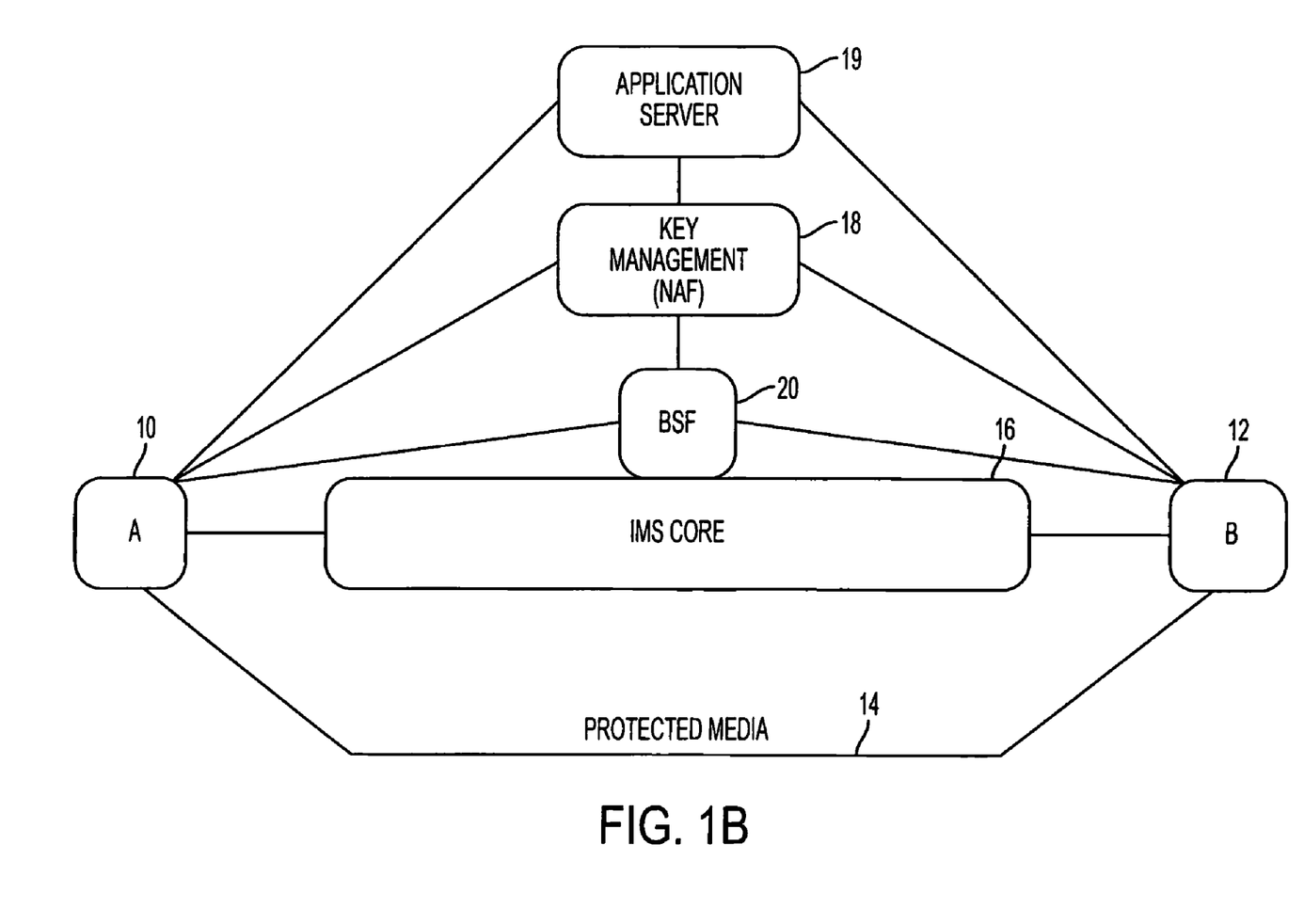
Figure 1C:
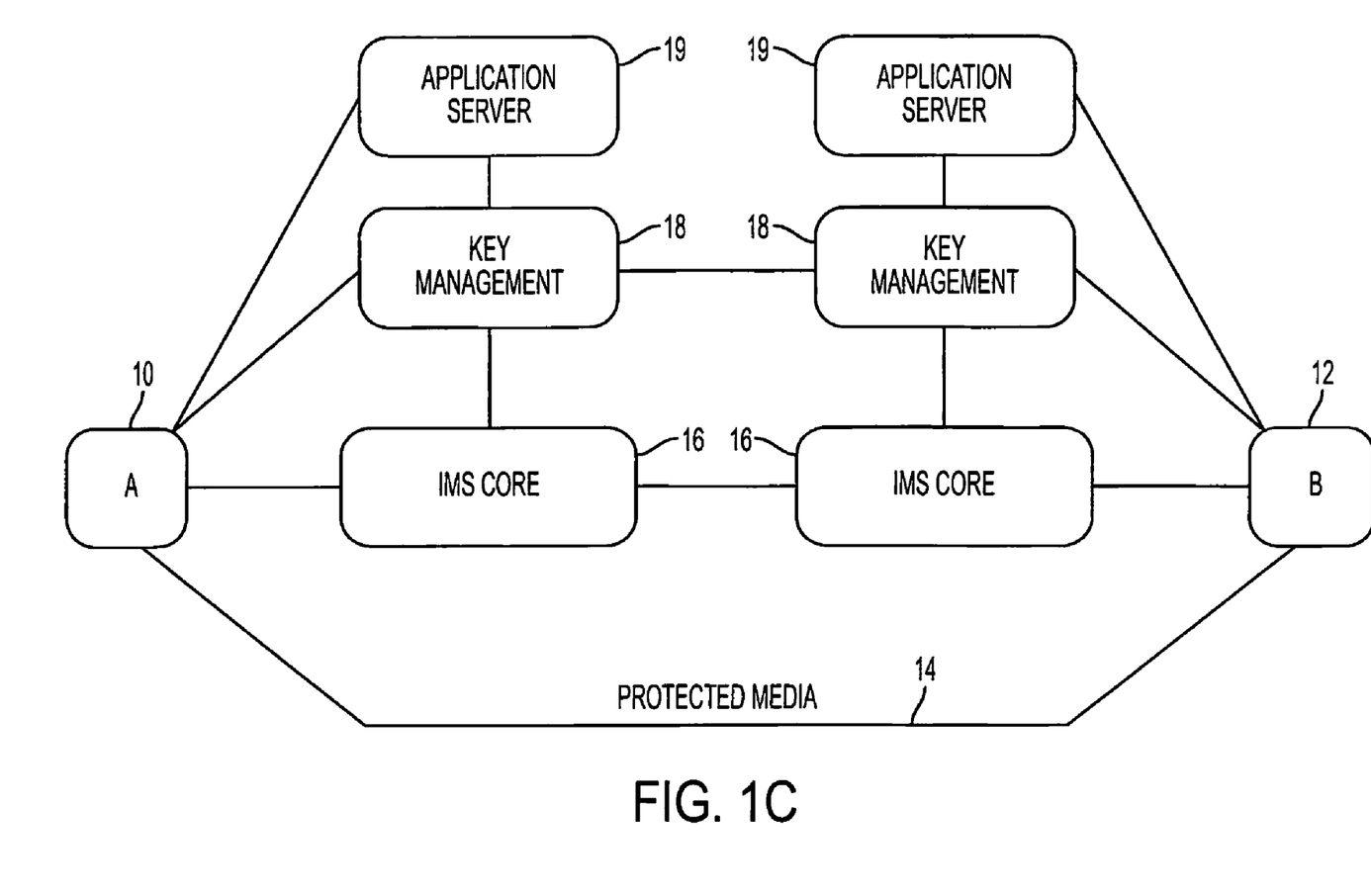

FIG. 1(a) depicts two clients 10 and 12 between which some protected media stream 14, e.g., IPTV, messaging, etc., is, or will be established. The general control signaling is handled by an IMS core network 16 in cooperation with a key management function 18 and an application server 19, e.g., associated with the particular type of protected media stream 14 of interest. As shown in FIG. 1(b), in some exemplary embodiments, a bootstrapping function (BSF) 20 may also be involved in the control functionality, and the key management function 18 can be implemented as a network application function (NAF), both of which are described in more detail below. In other exemplary embodiments, the control functionality may be distributed across multiple such entities as shown by way of example in FIG. 1(c). Prior to describing the exemplary techniques for bootstrapping key establishment according to the exemplary embodiments, some discussion of related security mechanisms will now be provided so that the reader will better understand the subsequently described exemplary embodiments.

The IMS Security Architecture standards specification known as 3GPP TS 33.203 "3rd Generation Partnership Project; Technical Specification Group Services and System Aspects; 3G Security; Access Security for IP Based Services", available at www.3gpp.org, and incorporated herein by reference, specifies Authentication and Key Agreement (AKA) based procedures as part of the IMS registration process. This signalling exchange provides a shared secret between the user equipment (UE), e.g., a client device 10, and the IMS domain that can be later used for IP-SEC protection of SIP IMS communications to/from that UE.

Figure 2:
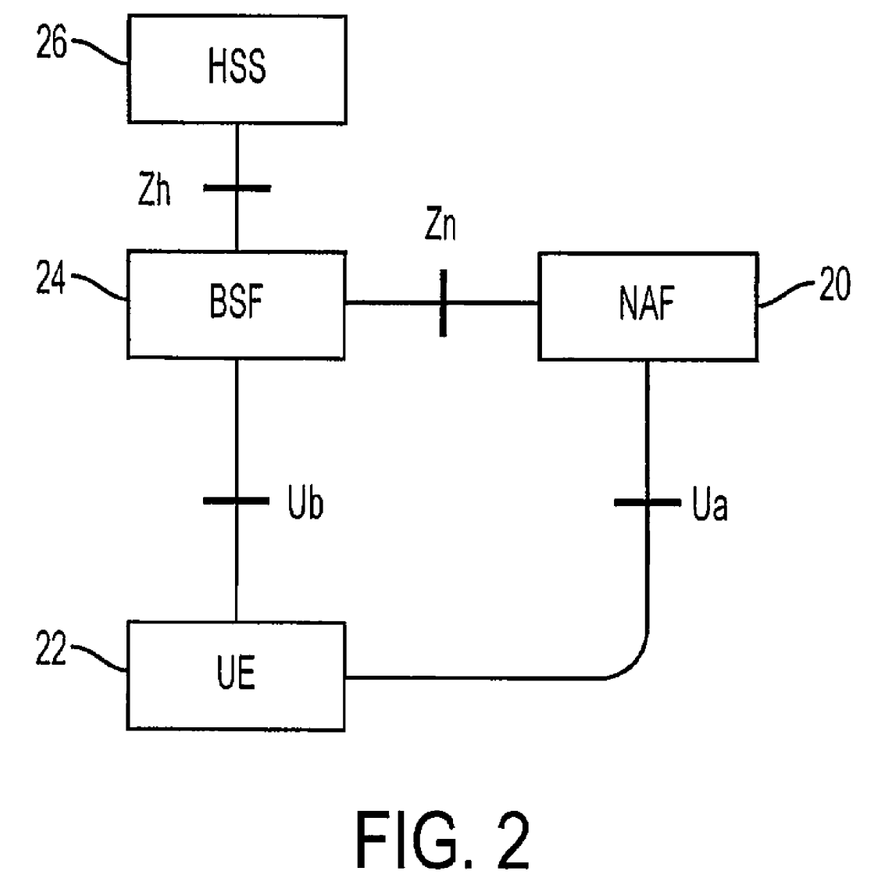
FIG. 2 depicts some of the communication nodes of interest in key exchange according to exemplary embodiments.

The 3GPP authentication infrastructure, including the 3GPP Authentication Centre (AuC), the USIM or the ISIM, and the 3GPP AKA protocol operating between these entities, is considered to be a very valuable asset of 3GPP operators. It has been recognized that this infrastructure could be leveraged to enable application functions in the network and on the user side to establish shared keys. Therefore, the 3GPP organization has defined a "Generic Bootstrapping Architecture" (GBA) which is capable of distributing shared secrets to the UEs and a Network Application Function (NAF) using AKA-based mechanisms. For example, according to 3GPP GBA TS 33.220 "3rd Generation Partnership Project; Technical Specification Group Services and System Aspects; Generic Authentication Architecture (GAA); Generic Bootstrapping Architecture", the disclosure of which is incorporated herein by reference, and as shown generally in FIG. 2, the GBA provides a reference model for bootstrapping keys in the NAF 20 and UE 22 with support from a new network infrastructure component, a Bootstrapping Server Function (BSF) 24 and the home subscriber server (HSS) 26. Specific interfaces, marked in FIG. 2 as Ua, Ub, Zn and Zh are also provided for signaling communication between these entities, an example of which will now be described below with reference to FIG. 3. GBA has also been specified for 3GPP2 systems.

Figure 3:
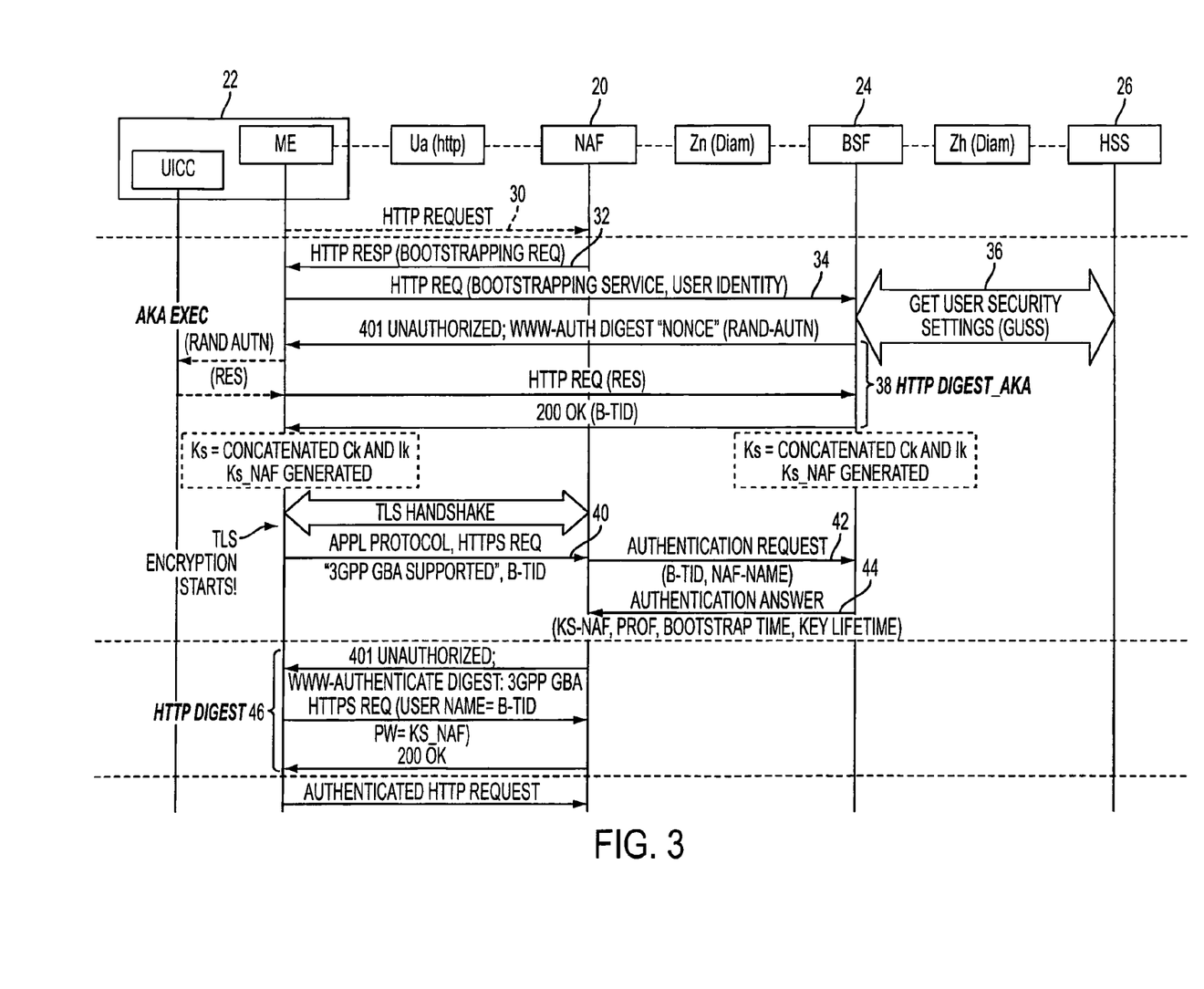
FIG. 3 is a signaling diagram illustrating signals associated with a non-SIP based key exchange.

Therein, a user or UE 32 tries to access an application by sending an http request 30 via the Ua interface (UE-NAF). If the NAF 20 requires the use of shared keys obtained by means of the GBA, but the request from UE 22 does not include GBA-related parameters, the NAF 30 replies with a bootstrapping initiation message 32, as shown in FIG. 3. The UE 22, as redirected by the NAF 20 or as configured via prior communication with a NAF 20 over the Ua interface, contacts the BSF 24 over the Ub interface (UE-BSF) via signal 34. The BSF 24 then contacts the HSS 26 over the Zh interface (signal 36) in order to be able to execute AKA authentication towards the UE 22 (over the Ub interface). The purpose of this user authentication is to generate shared secrets. The BSF 24 generates a Bootstrapping Transaction Identifier (B-TID) via the http digest_AKA signaling 38 that will identify the credential material being generated and which is subsequently forwarded to the NAF 20 in signal 40.

Alternatively, the UE 22 could have already included bootstrapping information in its initial http request 30, in which case the signaling flow will skip down to the portion of the illustration of FIG. 3 where the NAF 20 contacts the BSF 24 to authenticate. The B-TID has been propagated to the NAF 20 via the Ub and Ua interfaces through the UE 22 as signal 40. The NAF 20 contacts the BSF 24 over the Zn interface using the B-TID received from the UE 32 at signal 42. The BSF 24 replies back with the credential material for NAF consumption via signal 44. At this point, the NAF 20 is able to use the distributed credentials. In case this material should be used for further end-user authentication, the NAF 20 can initiate, e.g., an http-digest procedure 46 using the distributed shared secrets as defined in 3GPP GAA TS 33.222. The credentials can also be used for other purposes than authentication, e.g., integrity, confidentiality, and key derivation.

Thus, as described above, 3GPP TS 33.222 for GAA defines the Ua interface for client-server applications where the Ua interface disposed between the UE 32 and the NAF 30 is an http-based interface. The GAA/GBA NAF functionality may be hosted within an IMS SIP Application Server (AS), but the GAA/GBA procedures as currently defined are meant for providing authentication, key agreement and protection to user access to the IMS AS over non-SIP interfaces. In particular, these GAA/GBA procedures as currently defined are meant to provide such capabilities over http-based interfaces such as the Ut interface for self provisioning at e.g., an IMS Presence Server. However, there are scenarios where the AS exposes a SIP interface over the SIP/IP core or IMS for higher level applications, such as key management (KMS AS/NAF) or location distribution. Since the SIP-based AS/NAF (also called an "enabler" in OMA terminology) is likely to handle sensitive data, e.g. keys or location information, which needs to be protected end-to-end, it is not desirable that the sensitive data is directly exposed unnecessarily, e.g., exposed to untrusted parties, in such client-to-client situations. Instead, for such cases, the Ua interface can use the IMS core according to exemplary embodiments of the present invention so that the UE can still reach the KMS NAF to obtain keys, a conceptual example of which is illustrated in FIG. 4 below.

Figure 4:
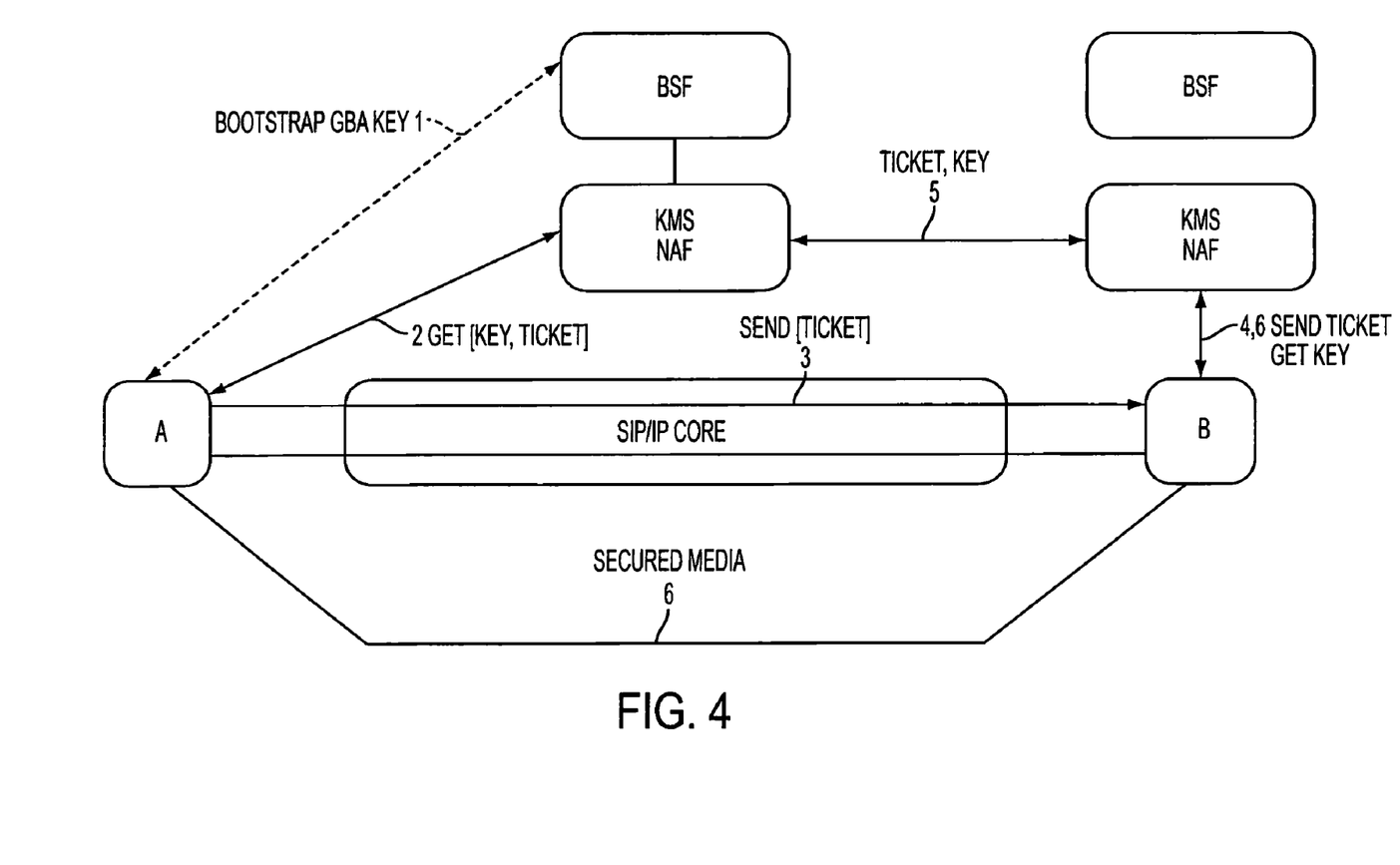
FIG. 4 illustrates SIP-based key exchange at a high level according to exemplary embodiments.

FIG. 4 illustrates the case when SIP signaling is used for key management for media protection using tickets. Should traditional GBA be used, then all involved elements would need to implement both SIP and non-SIP protocols which would increase the cost and complexity. Therefore it is preferably that all interfaces are SIP-based.

Thus, exemplary embodiments of the present invention provide for new mechanisms for GAA/GBA to secure access to a SIP-based Application Server (3GPP) or Enabler (OMA) over a SIP/IP core infrastructure, such as IMS. Additionally, exemplary embodiments provide related mechanisms for Ua access to a key management server (KMS) with NAF functionality via the SIP/IMS core. According to other exemplary embodiments, similar functionality can be provided when an AS resides behind an authentication proxy, which proxies are defined in 3GPP TS GAA 33.222, the disclosure of which is incorporated here by reference.

Figure 5:
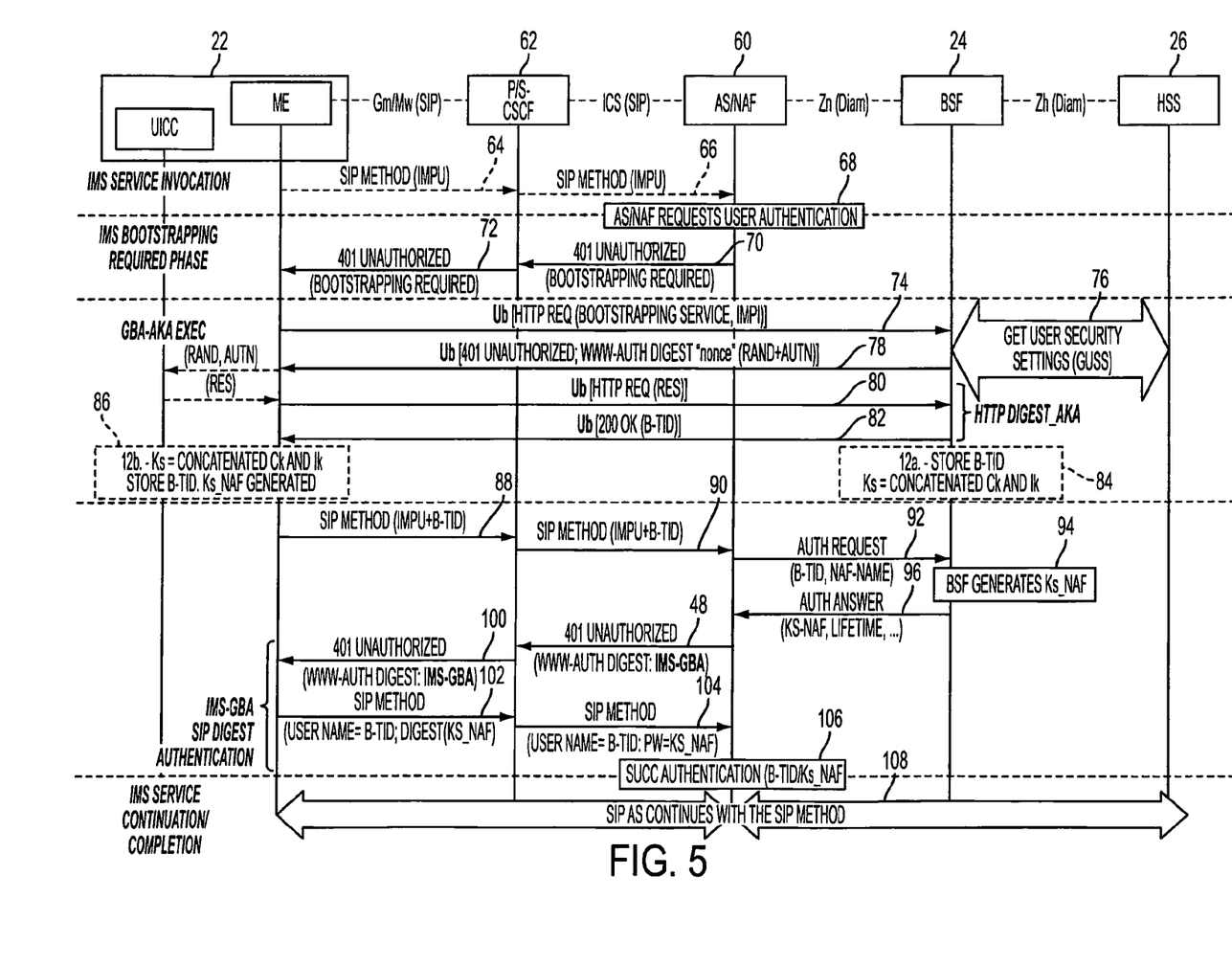
FIG. 5 is a signaling diagram illustrating signals and steps associated with a SIP-based key exchange according to an exemplary embodiment.

A detailed, yet purely illustrative, example of signaling associated with mechanisms according to these exemplary embodiments is provided as FIG. 5. Therein, for the GAA/GBA bootstrapping scenarios considered in these exemplary embodiments, the Ua reference point between the UE 22 and a KMS SIP-AS 60 is SIP-based instead of http-based. For example, the Ua reference point can be based on the sum of existing SIP-based Gm, Mw and ICS reference points within the IMS Core. When the UE 22 initiates a SIP Method towards a KMS SIP-AS 60 via a P/S CSCF node 62, as shown by signals 64 and 66, authentication is needed (step 68). This exemplary embodiment further describes that the KMS AS 60 behaves as a NAF in GBA and that the KMS AS 60 rejects the SIP Method request indicating that bootstrapping is required (signals 70 and 72). A new error code within the "401 Unauthorized" signals 70 and 72 (or, alternatively, a "421 Extension Required" message) may be used to indicate the need for bootstrapping. This shall, in turn, trigger the UE 22 to initiate GBA procedures over the Ub and Zh interfaces, for example, as currently defined in the above-incorporated by reference GBA TS 33.220 and as shown via steps/signals 74-86 in FIG. 5. SIP-based methods over Ub delivering the same functionality are also possible. Those skilled in the art will appreciate that the SIP methods to be used in such exemplary embodiments will depend on the use case, e.g., SIP INVITE, SIP SUBSCRIBE, etc., but other such SIP messages may also be used in the alternative.

Considering next the UE 22's initiation of GBA procedures in FIG. 5, i.e., starting with signal or step 88, the GBA procedures over Ua according to these exemplary embodiments are different from the currently defined GBA procedures, since the reference point/interface Ua is a SIP based interface over IMS Gm, Mw and ICS reference points. Thus, according to this exemplary embodiment, the UE 22 includes the B-TID within the SIP Method Request signals 88 and 90. The B-TID may, for example, be included within a new SIP header, although this is not required. The remainder of the GBA procedures over the Zn interface (i.e., signals/steps 92 to 96 in FIG. 5) is unchanged by the shift to a SIP-based Ua interface according to these exemplary embodiments.

Once the GBA procedures have been completed, the distributed Ks_NAF key can be used by the KMS NAF 60 to authenticate the UE 22. There are different possible authentication mechanisms which can be employed by these exemplary embodiments once the shared keys are in place, e.g., password, digest, PSK-TLS, one time password. FIG. 5 exemplifies the digest type of authentication, however it will be appreciated that other authentication techniques could likewise be employed in other exemplary embodiments. Thus, the KMS NAF 60 in this exemplary embodiment responds to the SIP method initiated by the UE 22 in steps 88 and 90 with a 401 "Unauthorized" response (signals/steps 98 and 100) also using a suitable SIP method. This response includes a "www-authenticate" header set to, for example, "digest:IMS-GBA" or "digest:3GPP-GBA" according to this exemplary embodiment. The UE 22 then uses the B-TID received from the BSF 24 and the Ks_NAF generated during the GBA-IMS procedures (in signals/steps 74 to 96) as User Name and digest, respectively, to answer the IMS-GBA digest challenge (signals/steps 102 and 104). If the user authentication is successful (step 106), then the SIP AS/NAF 60 will be able to continue with the SIP Method as needed (step 108).

Figure 6:
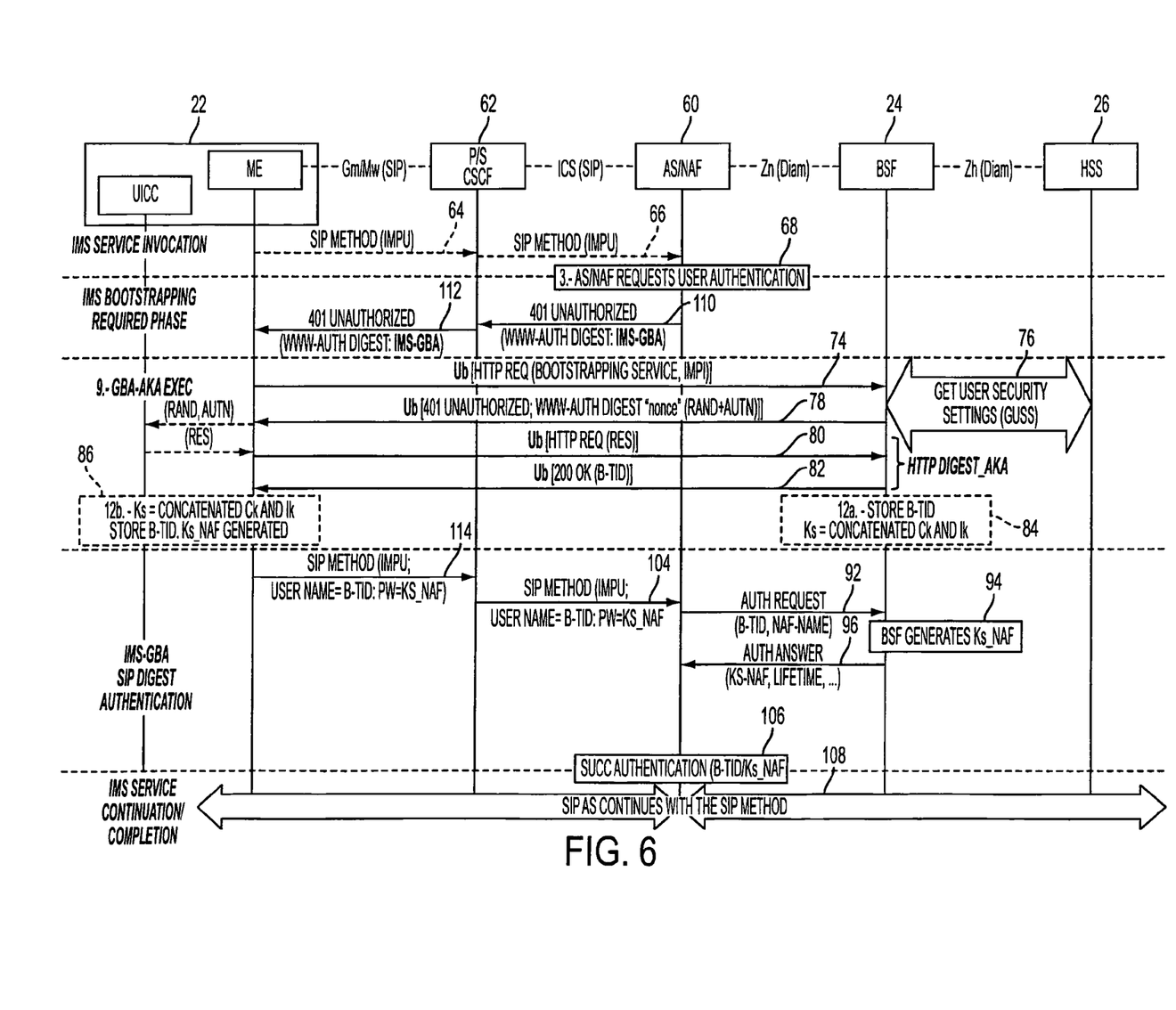
FIG. 6 is a signaling diagram illustrating signals and steps associated with a SIP-based key exchange according to another exemplary embodiment.

According to another exemplary embodiment, illustrated in FIG. 6, the authentication signaling flow of FIG. 5 may be simplified using IMS-GBA. In the signaling diagram of FIG. 6, the same reference numerals are used to refer to signals in FIG. 6 which perform the same function as described above with respect to FIG. 5 and such signals are not described again here. However, relative to the exemplary embodiment of FIG. 5, in the signaling flow of FIG. 6, the KMS NAF 60's indication to UE 22 that bootstrapping is required (signals 110 and 112) already includes the authentication challenge. Specifically, and for example, the KMS NAF 60 responds with a 401 "Unauthorized" including a "www-Authenticate" header set to, for example, "digest:IMS-GBA" in signal 110. This serves as a bootstrapping indicator and will allow the UE 22 to include the B-TID and Ks_NAF as a response to the digest challenge in the next UE interaction with the KMS NAF 60 (signals 114 and 116). Thus, four signals/steps are saved or eliminated, e.g., signals/steps 98-104 of FIG. 5, by employing the signaling flow according to this exemplary embodiment.

Figure 7:
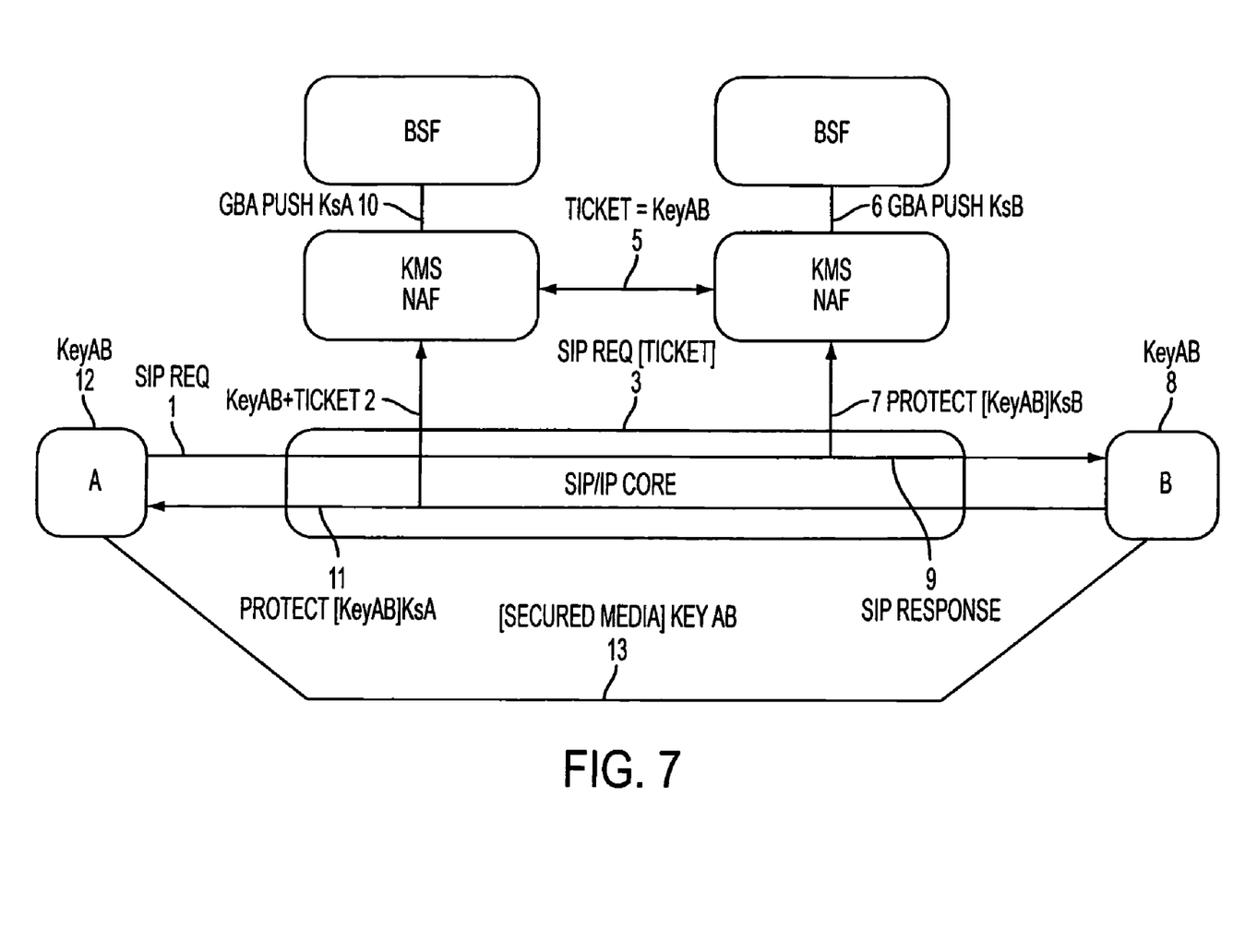
FIGS. 7-10 depict alternative signaling arrangements according to other exemplary embodiments.
Figure 8:
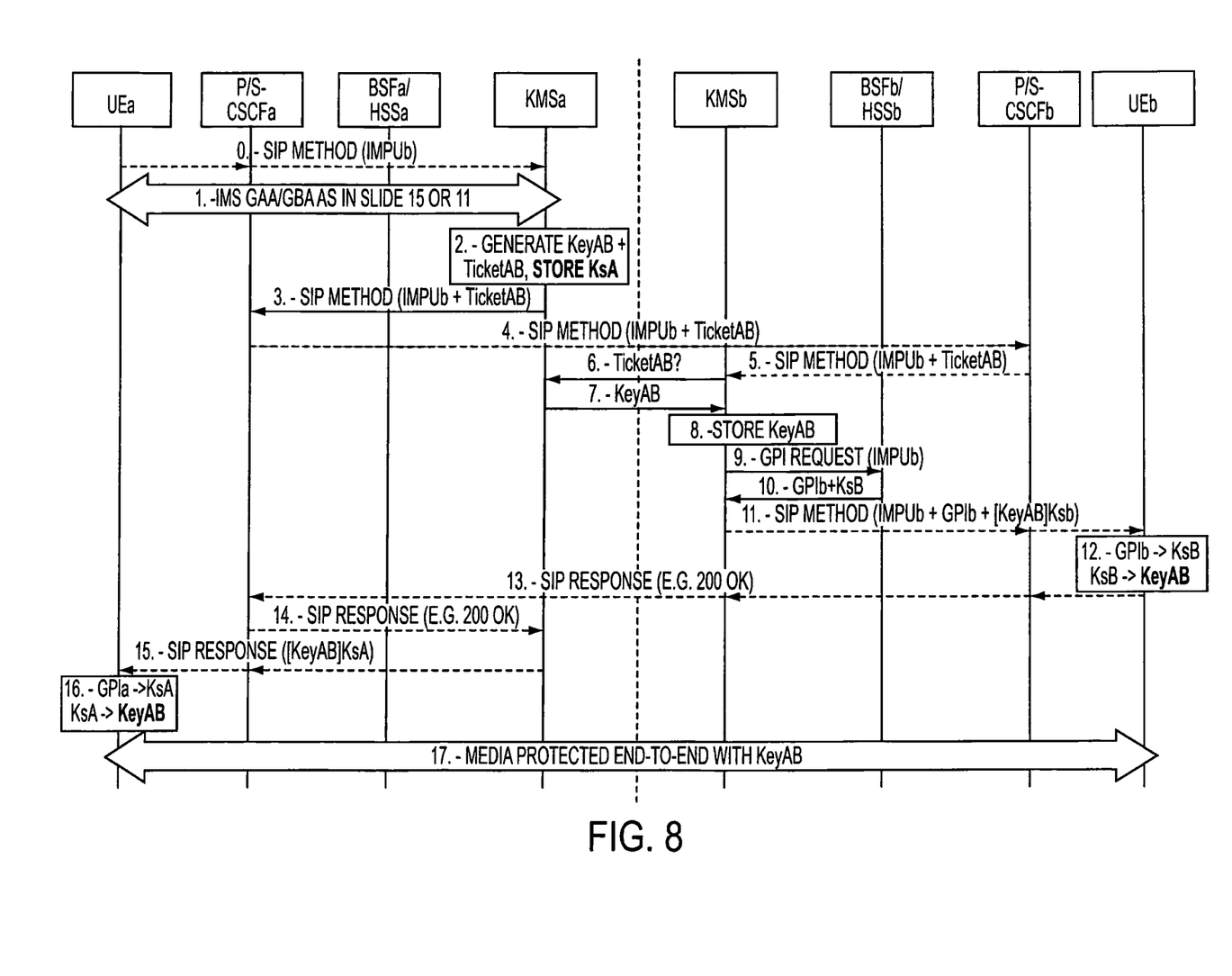
Figure 9:
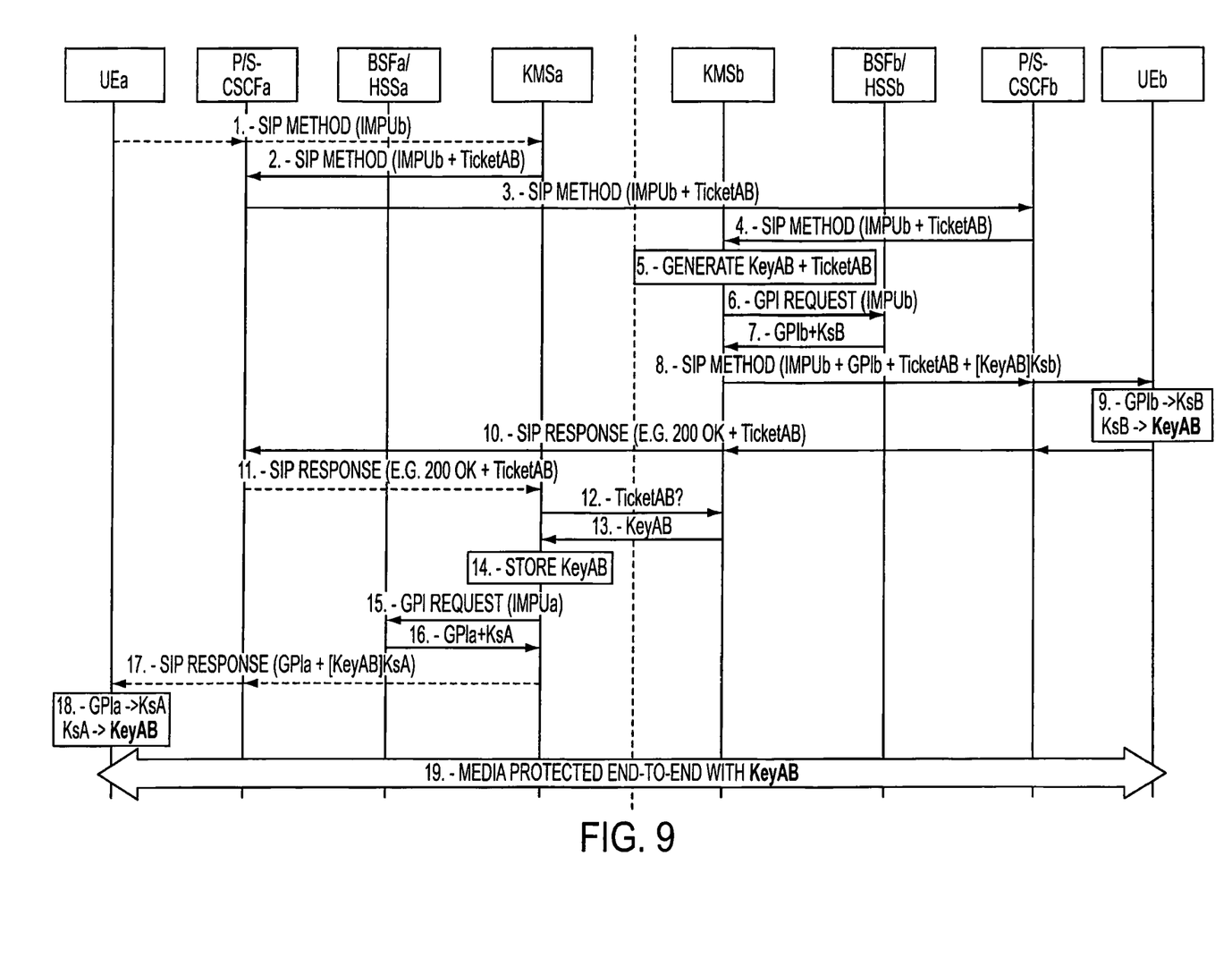
Figure 10:
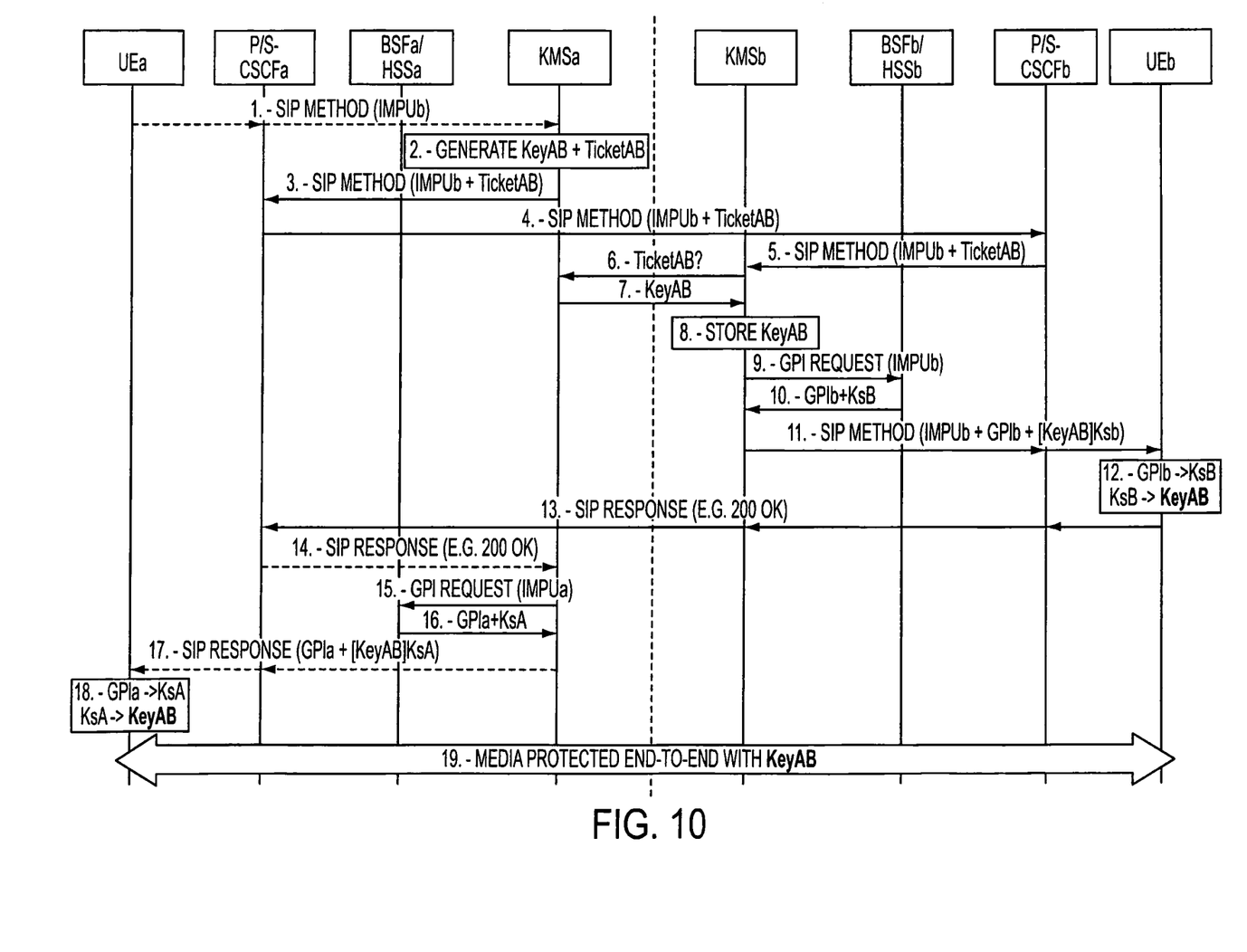

According to another exemplary embodiment, a GBA-push protected KMS key exchange mechanism can be provided. For example, in situations where IMS is used for peer to peer communication, and SIP is used for session control, i.e., establishment, control, and termination), SIP Application Servers may be disposed in the path adding application level control. For example, a KMS may be connected as SIP AS to the IMS core. The user media plane is currently protected (integrity and confidentiality) hop-by-hop, i.e., primarily between UEs and respective P-CSCFs, where an NDS applies intra IMS Core and between IMS Core domains. One objective of this exemplary embodiment is to distribute a KMS "KeyAB" between UEa and UEb over a SIP IMS Core so that they can protect media end-to-end. An exemplary architecture associated with this exemplary embodiment is shown in FIG. 7. The KeyAB may be generated at the originating KMS (as shown in the signalling diagram of FIG. 8) or at the terminating KMS (as shown in the signalling diagram of FIG. 9). According to these exemplary embodiments, the KeyAB can be securely distributed by leveraging on GBA-Push at both sides, with the SIP Requests/Responses used as the Push channel. Traditional GBA can be used at the originating side, as shown in the signalling diagram of FIG. 10, but most likely cannot be used at the terminating side.

Figure 11:
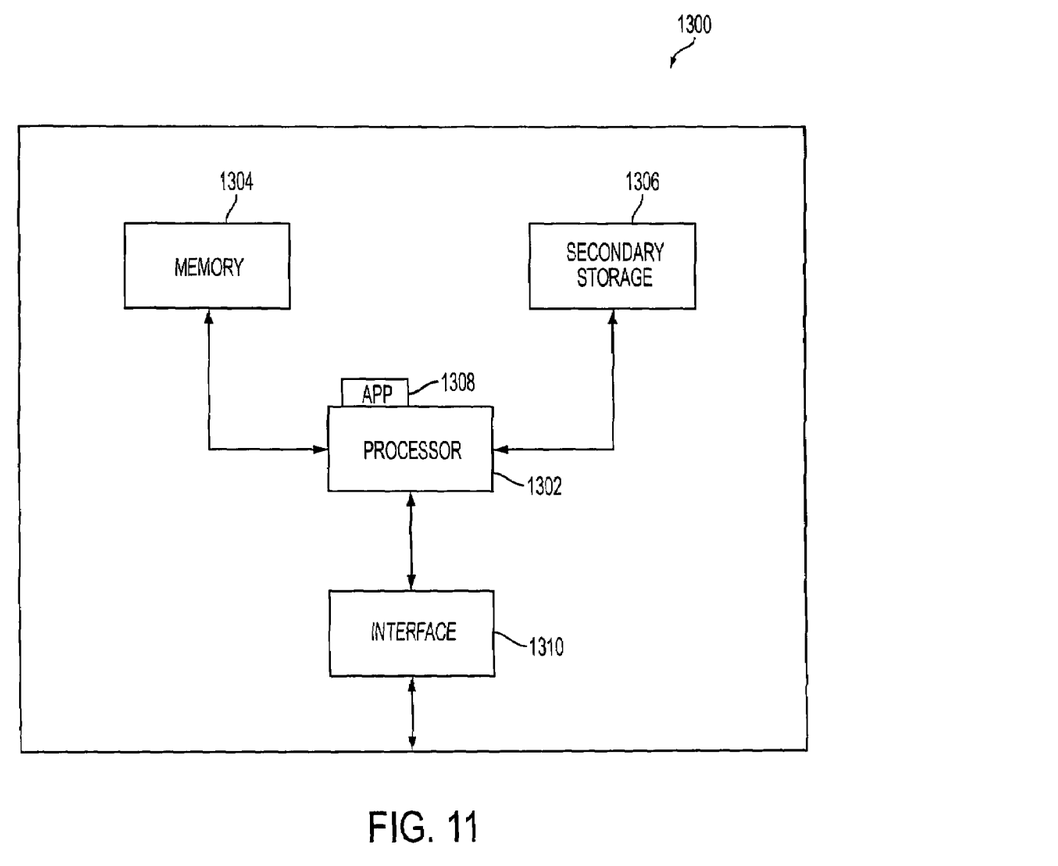
FIG. 11 is a communications node according to exemplary embodiments.

The exemplary embodiments described above provide for, among other things, implementing a SIP-based Ua reference point or interface associated with key exchanges involving a variety of communication nodes associated with both one or more networks and user equipments. Such nodes include, for example, user equipment, a SIP/IP core node (e.g., a P/S CSCF) and an application server. An exemplary communications node 1300 which can be used, for example, to implement such systems, devices, methods and software, including, for example, a user equipment, a SIP/IP core node (e.g., a P/S CSCF) and an application server will now be described with respect to FIG. 11. Therein, node 1300 can contain a processor 1302 (or multiple processor cores), memory 1304, one or more secondary storage devices 1306, one or more software applications running on the processor(s) 1302 and an interface unit 1310 to facilitate communications between node 1300 and the rest of the network. In some cases, interface 1310 may include a wireless transceiver for communicating with other nodes via an air interface, which will enable the node 1300 to exchange the signals described above with respect to, for example, FIG. 5.

As will be appreciated by those skilled in the art, methods such as those described herein can be implemented completely or partially in software. Thus, systems and methods for processing data according to exemplary embodiments of the present invention can be performed by one or more processors executing sequences of instructions contained in a memory device. Such instructions may be read into the memory device 1304 from other computer-readable mediums such as secondary data storage device(s) 1306, which may be fixed, removable or remote (network storage) media. Execution of the sequences of instructions contained in the memory device causes the processor to operate, for example, as described above. In alternative embodiments, hard-wire circuitry may be used in place of or in combination with software instructions to implement exemplary embodiments.

A number of variations and permutations associated with the foregoing exemplary embodiments may be provided in actual implementation. For example, although the foregoing exemplary embodiments presume that the AS exposes a SIP interface, it is also possible that, for some applications or business/trust models, the GBA BSF node also exposes a SIP interface over an IMS architecture. For such cases, these exemplary embodiments may be readily extended to exploit such exposure. The execution of the user subscription/registration to a NAF service within a GBA secured session according to these exemplary embodiments will enable, for example, harmonization of protocols, i.e., reduced complexity of implementations and specifications since only SIP is used instead of combinations of SIP, HTTP, and usage of IMS in new business/trust models such as National Security, Enterprise, Governmental Applications requiring e2e security. Moreover, these exemplary embodiments provide added value to the IMS infrastructure because, for example, there is need to expose, for example, the AS/Enabler which can reveal network topology.

The above-described exemplary embodiments are intended to be illustrative in all respects, rather than restrictive, of the present invention. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

The invention claimed is:

1. A method for bootstrapping key establishment to exchange encryption keys between a terminal-based client, a bootstrapping server and an application server, all using Session Initiation Protocol (SIP) signaling, the method comprising the steps of:
    obtaining a Bootstrapping Transaction Identifier (B-TID) using a SIP message;
    transmitting, from said terminal-based client, a SIP message including said B-TID to a SIP/IP Core Node
    receiving said SIP message at said SIP/IP core node;
    routing said SIP message, including said B-TID, to said application server;
    transmitting, in response to said SIP message and by said application server, an authorization request message which includes said B-TID to a bootstrapping function (BSF) entity;
    generating, at said BSF entity, a shared key Ks_(ext/int)_NAF value associated with said B-TID;
    transmitting, from said BSF, said Ks_(ext/int)_NAF value to said application server;
    transmitting, from said application server, a response message back to said SIP/IP core node; and
    routing said response message from said SIP/IP core node to said terminal- based client.

2. The method of claim 1, prior to said step of transmitting, from said terminal-based client, said SIP message including a Bootstrapping Transaction Identifier (B-TID), the steps of:
    transmitting, from said terminal-based client, a first SIP message to invoke IMS service;
    receiving said first SIP message at said SIP/IP core node;
    routing said first SIP message to said application server; and
    transmitting, in response to said first SIP message and by said application server, a message indicating that bootstrapping is required to said terminal-based client.

3. The method of claim 1, wherein a key management server is co-located with said application server.

4. The method of claim 1, wherein said application server resides behind an authentication proxy node.

5. The method of claim 1, further comprising:
    performing an authentication process between said terminal-based client and said application server based on said response and said Ks_(ext/int)_NAF value received by said application server over a SIP message.

6. The method of claim 5, wherein said authentication process is one of: a password, a digest, a PSK-TLS, and a one time password authentication technique.

7. The method of claim 1, wherein said terminal-based client is a location client and wherein said application server is a location application server.

8. A system for bootstrapping key establishment to exchange encryption keys between a terminal-based client, a bootstrapping server and an application server, all using Session Initiation Protocol (SIP) signaling, the system comprising:
    a terminal-based client device which is configured to receive a Bootstrapping Transaction Identifier (B-TID) using a SIP message and to transmit a SIP message including said B-TID;
    a SIP/IP core node which is configured to receive said SIP message and which is also configured to route said SIP message, including said B-TID, to said application server; and
    an application server which is configured to transmit, in response to said SIP message, an authorization request message which includes said B-TID to a bootstrapping function (BSF) entity;
    wherein said BSF entity is configured to generate a Ks_(ext/int)_NAF value associated with said B-TID and is further configured to transmit said Ks_(ext/int)_NAF value to said application server;
    wherein said application server is further configured to transmit a response message back to said SIP/IP core node; and
    wherein said SIP/IP core node is further configured to route said response message to said terminal-based client.

9. The system of claim 8, wherein prior to said terminal-based client transmitting said SIP message including said Bootstrapping Transaction Identifier (B-TID), said terminal based client is further configured to transmit first SIP message to invoke IMS service and said SIP/IP core node is further configured to receive said first SIP message and to route said first SIP message to said application server,
    wherein said application server is further configured to, in response to receipt of said first SIP message, transmit a message indicating that bootstrapping is required to said terminal based client.

10. The system of claim 8, further comprising:
    a key management server which is co-located with said application server.

11. The system of claim 8, wherein said application server resides behind an authentication proxy node.

12. The system of claim 8, wherein said terminal-based client and said application server are further configured to perform an authentication process therebetween based on said response and said Ks_(ext/int)_NAF value received by said application server.

13. The system of claim 12, wherein said authentication process is one of: a password, a digest, a PSK-TLS, and a one time password authentication technique.

14. The system of claim 8, wherein said terminal-based client is a location client and wherein said application server is a location application server.

* * * * *